No. 663,547. Patented Dec. 11, 1900.
M. B. LEMLEY.
WATER FILTER.
(Application filed Feb. 28, 1900.)
(No Model.)
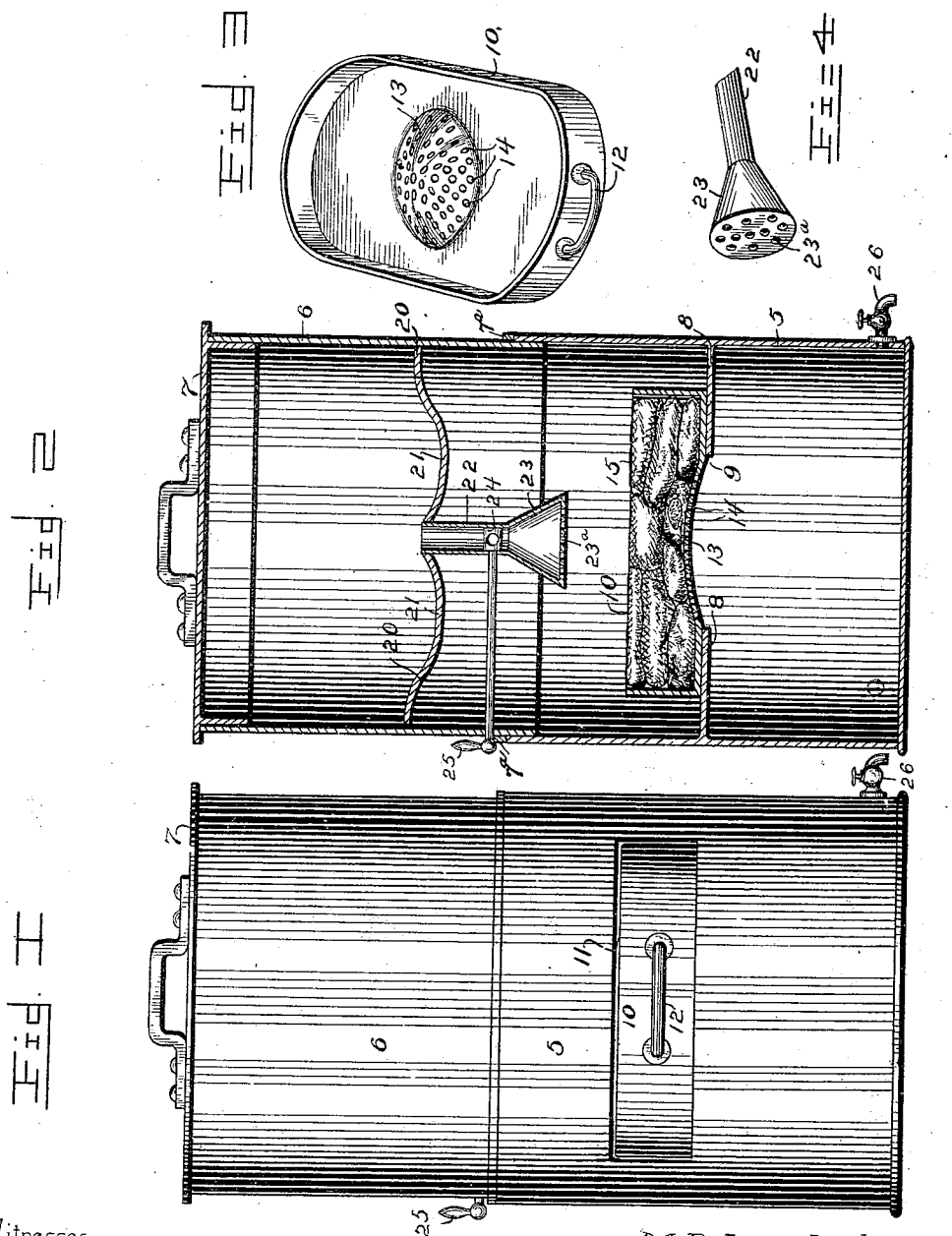
Witnesses
F. J. Campbell.
M. B. Lemley, Inventor
By his Attorneys.
C. A. Snow & Co.

UNITED STATES PATENT OFFICE.

MORGAN B. LEMLEY, OF DELTA, IOWA.

WATER-FILTER.

SPECIFICATION forming part of Letters Patent No. 663,547, dated December 11, 1900.

Application filed February 28, 1900. Serial No. 6,872. (No model.)

*To all whom it may concern:*

Be it known that I, MORGAN B. LEMLEY, a citizen of the United States, residing at Delta, in the county of Keokuk and State of Iowa, have invented a new and useful Water-Filter, of which the following is a specification.

This invention relates to filters in general, and more particularly to that class employed for filtering water; and it has for its object to provide such a construction and arrangement as will insure an efficient filtration, in which the water will be evenly distributed over the filtering medium, and in which, furthermore, the fitering medium may be readily applied and removed without dissembling the other parts of the structure.

In the drawings forming a portion of this specification, and in which similar numerals of reference designate like and corresponding parts in the several views, Figure 1 is a front elevation showing the filter and its parts assembled for operation. Fig. 2 is a central vertical section of the filter, the bags of filtering material and other parts being shown in elevation. Fig. 3 is a detail perspective view showing the drawer which receives the filtering material. Fig. 4 is a detail perspective view of the spraying-nozzle from which the water is directed to the filtering material.

Referring now to the drawings, the filter of the present invention comprises a preferably cylindrical vessel 5, forming the base of the filter and having an open upper end for the reception of a removable section 6, which is similar in form to the base and is adapted to rest with its lower edge within the upper edge of the base, and with a flange 7ª resting upon the upper edge of the base, this removable section 6 being provided with a cover 7. Transversely of the cylindrical base 5 is fixed a partition comprising two sections 8, which are segmental in form and are secured with their curvilinear edges against the inner face of the base, so as to lie in a common plane, the straight edges being separated by an interspace 9. The sections of the partition 8 form supports for a drawer 10, one end of which is curved to lie against the inner face of the base, while the opposite end is curved to lie flush with the outer face of the base, it being understood that the drawer is moved into and out of position upon the partition through an opening 11 in the wall of the base.

The drawer 10 is provided with a handle 12 to facilitate the application and removal, and the central portion of the drawer is struck up in curvilinear form, as shown at 13, and is provided with perforations 14. In this drawer 10 is placed the filtering material, consisting of any of the well-known filtering materials, contained in bags and piled one upon another in the drawer, as shown at 15 in Fig. 2. It will be seen that this arrangement of the filtering material facilitates the application and removal of it, while the employment of the drawer permits the filtering material to be placed and displaced with respect to the body 5 without deranging the other parts of the structure.

In the upper cylindrical section 6 is disposed a transverse partition 20, having an annular depression surrounding its center, as shown at 21, to form a sediment-receiving channel into which the solid impurities in the water will be in part collected, it being understood that the water to be filtered is poured into the section or vessel 6 above the partition.

Centrally of the partition 20 is formed a perforation with which communicates a depending tube 22, having a frusto-conical nozzle 23 at its lower end, in the base of which are formed perforations 23ª, adapted to spray the water upon the bags of filtering material in the drawer 10. The pipe 22 is provided with a cut-off and regulating valve 24, having a handle 25, by means of which the valve may be opened and closed.

In practice the water is poured into the section 6, and by opening the valve 24 it is permitted to pass through the nozzle 23 and upon the filtering material in the drawer 10, through which it passes, and thence through the perforations 14 and below the partition 8, from whence it may be drawn through a spigot 26.

It will of course be understood that in practice the parts of the structure may be made of any suitable material, size, and proportions and that modifications may be made to adapt it to domestic and public plants for operation under different conditions without departing from the spirit of the invention.

What is claimed is—

1. A filter comprising a hollow base provided with supports, a drawer disposed slidably upon the supports, and filtering material in the drawer, said drawer having a foraminous bottom.

2. A filter comprising a body portion having a side opening, supports within the body portion adjacent the opening, a drawer upon the supports and adapted for movement through the opening, openings in the drawer, a filtering material in the drawer, and means for supplying water to the filtering material.

3. A filter comprising a hollow base having a side opening, supports in the base adjacent the opening, a drawer upon the support and movable through the opening, openings in the drawer, filtering material in bags disposed in the drawer, and means for supplying water to the filtering material.

4. A filter comprising a base portion adapted for the reception of a filtering material, and a partition above the filtering material, said partition having an opening for the passage of water to the filtering material and a depression in the upper face of the partition, said depression lying below the upper edge of the opening and surrounding the opening.

5. A filter comprising a hollow base, a drawer slidably disposed in the base and adapted for the reception of filtering material, a vessel mounted upon the base, a partition in the vessel above the drawer, said partition having a central perforation for the passage of water through the filtering material and having portions thereof depressed below its center, and a spraying-nozzle communicating with the perforation in the partition for directing water to the filtering material.

In testimony that I claim the foregoing as my own I have hereto affixed my signature in the presence of two witnesses.

MORGAN B. LEMLEY.

Witnesses:
FERD CLEMENS, Jr.,
TERRIC RHOADES.